United States Patent
Wiesen et al.

(10) Patent No.: US 9,324,366 B1
(45) Date of Patent: Apr. 26, 2016

(54) CONTROLLING TRACK DENSITY IN STORAGE DISCS

(71) Applicant: Seagate Technology LLC, Cupertino, CA (US)

(72) Inventors: Kurt Charles Wiesen, Lyons, CO (US); Peter S. Harllee, III, Boulder, CO (US); Randall Clement Bauck, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/676,742

(22) Filed: Apr. 1, 2015

(51) Int. Cl.
*G11B 5/02* (2006.01)
*G11B 5/09* (2006.01)
*G11B 20/12* (2006.01)

(52) U.S. Cl.
CPC .... *G11B 20/1217* (2013.01); *G11B 2020/1238* (2013.01)

(58) Field of Classification Search
CPC .... G11B 5/012; G11B 5/09; G11B 20/10009; G11B 27/36; G11B 2220/90; G11B 27/3027; G11B 5/02
USPC .................. 360/45, 75, 39, 69, 31; 369/47.28, 369/47.53, 47.41
See application file for complete search history.

(56) References Cited

U.S. PATENT DOCUMENTS

| | | | |
|---|---|---|---|
| 6,765,737 B1 | 7/2004 | Lim et al. | |
| 7,046,471 B2 | 5/2006 | Meyer et al. | |
| 7,317,587 B2 * | 1/2008 | Furuhashi | G11B 5/012 360/48 |
| 7,418,531 B2 * | 8/2008 | Brewer | G06F 3/0605 710/36 |
| 7,705,588 B2 | 4/2010 | Eaton et al. | |
| 8,102,613 B2 | 1/2012 | Duan et al. | |
| 8,325,434 B2 | 12/2012 | Namkoong et al. | |
| 8,736,995 B1 | 5/2014 | Wiesen et al. | |
| 9,099,135 B1 | 8/2015 | Bao et al. | |
| 2013/0238834 A1 | 9/2013 | Feldman et al. | |

* cited by examiner

*Primary Examiner* — Nabil Hindi
(74) *Attorney, Agent, or Firm* — Mueting, Raasch & Gebhardt, P.A.

(57) ABSTRACT

Devices including at least one storage disc having a recording surface segmented into a plurality of radial zones, each radial zone having an inner diameter and an outer diameter, each of the plurality of zones having a plurality of concentric tracks; and a track density ramp ratio assigned to each of the plurality of zones, where the track density ramp ratio describes an increase in the track density from the inner diameter of the zone to the outer diameter of the zone.

20 Claims, 7 Drawing Sheets

CONTROLLING TRACK DENSITY IN STORAGE DISCS

SUMMARY

Disclosed herein are devices including at least one storage disc having a recording surface segmented into a plurality of radial zones, each radial zone having an inner diameter and an outer diameter, each of the plurality of zones having a plurality of concentric tracks; and a track density ramp ratio assigned to each of the plurality of zones, where the track density ramp ratio describes the increase in track density from the inner diameter of the zone to the outer diameter of the zone.

Also disclosed are methods including determining a first tracks per inch (TPI) and flux changes per inch (FCI) value of a first track, the first track being one of a plurality of radial concentric tracks on a recording surface of a storage disc, the plurality of radial concentric tracks being segmented into a plurality of radial zones, each of the plurality of zones having an inner zone diameter and an outer zone diameter, the first track being at the inner zone diameter of a first zone; determining a second TPI and FCI at an inner zone diameter of a second zone, the second zone adjacent to the first zone but closer to the outer diameter of the storage disc than the first zone; and assigning a track density ramp ratio for the first zone such that a value of areal density (TPI*FCI) at the outer zone diameter of the first zone is the same as the areal density at the inner zone diameter of the second zone.

Further disclosed are methods that include determining a first track density ramp ratio for a first zone, the first zone being one of a plurality of radial zones, each of the plurality of zones having an inner zone diameter and an outer zone diameter, each of the plurality of zones containing a plurality of radial concentric tracks on a surface of a recording surface of a storage disc, the first track density ramp ratio chosen to compensate for a drop in flux changes per inch (FCI) from the inner zone diameter to the outer zone diameter of the first zone; and determining a track density ramp ratio for a second zone, the second zone being one of the plurality of radial zones.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
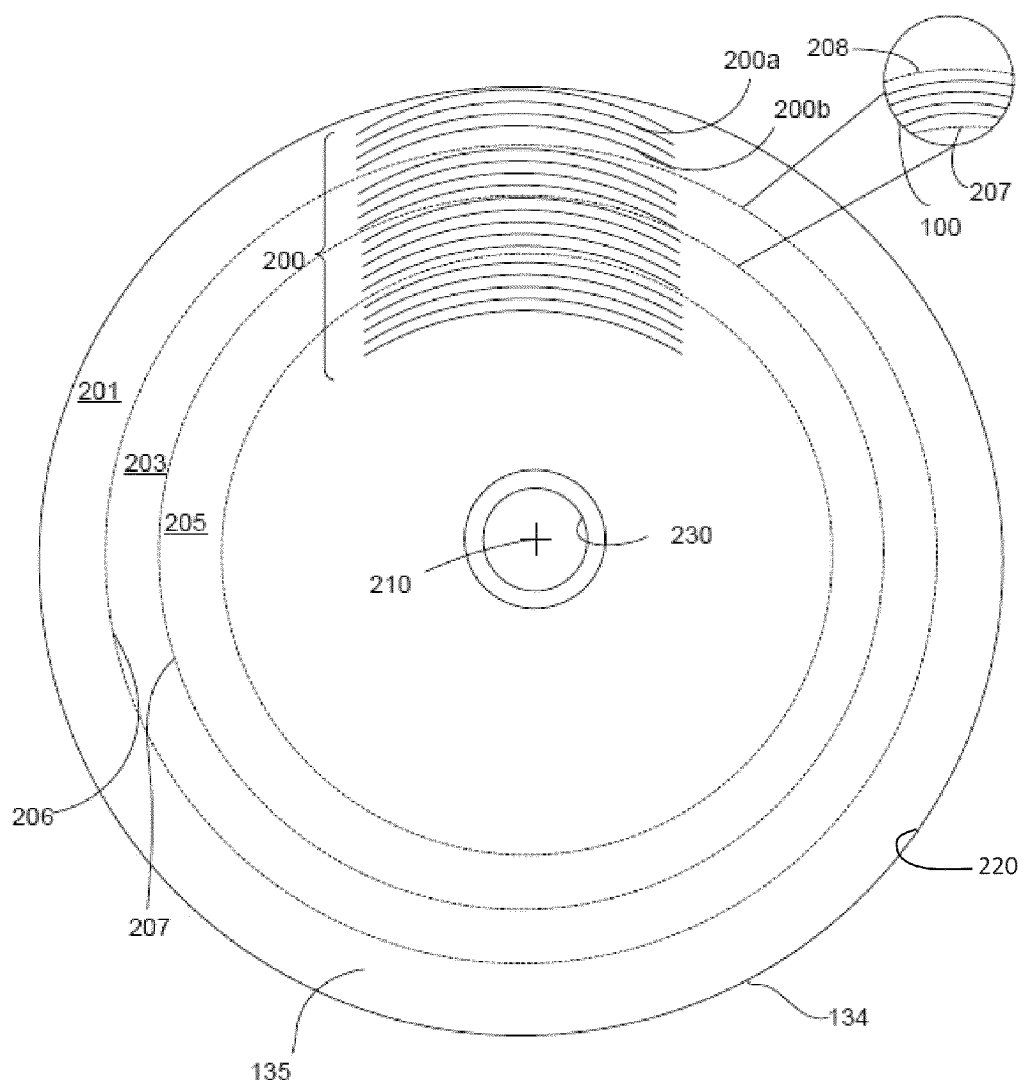
FIG. 1 is a schematic representation of a storage disc.

High TPI in a disc drive is desirable since drive capacity increases linearly with TPI. However, since the data must be written and read back at a sufficiently high signal to noise ratio (SNR), the physical width of the read and write transducer limit the TPI that can be achieved. A good measure of this fundamental, SNR-driven separation of tracks is the squeeze-to-dead track pitch (track pitch is 1/TPI) measured at 50% sector or codeword failure rate, or $P_{S2D}$.

Furthermore, TPI must be further reduced to margin for track misregistration (TMR) during operation of the drive. TPI can be defined as the number of tracks per radial inch on the disc (radial TPI). Or, for a drive with a rotary actuator, it is often convenient to define TPI as the number of tracks per inch of arc (arc TPI) described by the rotary actuator (i.e., the path taken by the head as it is moved from the inner diameter (ID) to the outer diameter (OD) of the disc). The relationship between radial and arc TPI is determined by the mechanics of the disc drive (e.g., arm length and pivot-to-spindle distance). If arc TPI is constant, then radial TPI varies slowly from the ID to the OD of the disc as shown for the example in FIG. 3B. It should be understood that any further reference to TPI in this application may refer to either arc TPI or radial TPI and that the two are mathematically related for any drive.

In a drive, TPI can vary across the disc. This is because $P_{S2D}$ changes in response to changes in head skew angle, data FCI, disc magnetics, disc velocity, and other factors. Also, TMR can change between the disc ID and OD so that the amount of margin that must be added to the track spacing will also change. The changes in TPI across the disc can have a component that is slowly varying. This slow variation in TPI may be due to head skew angle, slow trends in data FCI, disc magnetics, disc velocity, and other factors. Typically this slow variation is deemed to be the same for all heads and drives and is fixed by the servo system. The changes in TPI across the disc can also occur abruptly at zone boundaries due to the abrupt changes in FCI that occur at zone boundaries. FCI changes at zone boundaries are due mainly to zone-by-zone optimization of FCI during the drive self test process. The TPI changes at the zone boundaries of existing drives represent an offset of the underlying slowly varying TPI dependence. Stated another way, the only variation of TPI within a zone in previously utilized devices is due to an underlying slowly varying TPI dependence. Disclosed herein are methods that include additional within-zone TPI variation that may serve to compensate for the capacity loss inherent in the use of constant-frequency zones.

Magnetic recording discs have been separated into constant frequency zones in order to address issues related to linear density changes from the ID to the OD of a disc. While necessary, these constant frequency zones impart a loss of data capacity that is inversely proportional to the number of zones used. In some embodiments, the number of zones on discs have increased from 16 zones, to 32 zones, to 60 zones, and to more than 100 zones today. The gains obtained by increasing the number of zones were dramatic at first, but the later increases (e.g., 60 zones to 100 or more zones) offered smaller gains while at the same time increasing manufacturing and operational complexity. Therefore there remains a need for other methods of reducing zonal capacity loss.

Disclosed herein are methods and devices that include the use of track density ramps that are used across individual zones in order to maximize the capacity of a storage disc. In some embodiments, ramp is understood to include an increase by some fixed or variable rate as a physical location changes—for example farther away from an ID. Disclosed methods can be utilized with any types of storage discs including, for example conventional perpendicular magnetic recording (CMR) or shingled magnetic recording (SMR) methods and devices. In some embodiments of SMR methods and devices, data tracks on the surface of a disc are said to overlap or overlay each other to increase areal density.

FIG. 1 is a schematic representation of the tracks 200 across the surface 135 of a disc 134. Each of the tracks 200 is a general circle about the center point 210 of the disc 134, in some embodiments tracks 200 can be concentric circles about center point 210. The disc 134 has an outer diameter 220 and an inner diameter 230 of the disc 134. The disc 134 is delineated into zones, three of which exemplary zones 201, 203 and 205 are depicted in FIG. 1. Each zone has an inner diameter and an outer diameter, illustrated by the outer diameter 206 and inner diameter 207 of the second zone 203. Although only three radial zones are shown in FIG. 1, any number of radial zones can be present on the surface. Embodiments of the present invention provide the ability for the total number of these zones to be lowered or minimized—such as less than or equal to 16 zones, 32 zones, 60 zones, or 100 zones.

In previously utilized methods and discs, the spacing of the tracks 200 on the disc 134 was determined solely by the spacing necessary for a good signal to noise ratio plus margin for track misregistration (TMR) (e.g., interference due to the inability of a recording system to maintain exact relative positions of the heads and the data track on the media). The spacing necessary for a desired signal to noise ratio varies slowly across the disc due to head skew angle and other factors. TMR also varies slowly across the disc so that previously the TPI would also vary slowly across the disc in response to these effects, though it is possible in an SMR drive to have approximately constant arc TPI across the disc. When the disc is servo written, the servo writer would be moved in an incremental fashion so that tracks having radial positions that vary uniformly would be written to the surface 135 of the disc 134.

Within a constant frequency zone of a storage disc, the flux changes per inch (FCI) drops from the inner diameter to the outer diameter. It can be the case in magnetic recording that by lowering the FCI, a higher TPI can be utilized (i.e., they are inversely coupled), therefore the FCI drop across a zone can be accompanied by a TPI increase. Such a configuration would afford more areal density (FCI*TPI) because it allows the extra TPI margin to be utilized from the ID to the OD of any zone. The inverse coupling of TPI and FCI is very profound and virtually a one to one factor in SMR. In CMR, the TPI and FCI are inversely coupled, but not in a one to one fashion. Disclosed methods and devices can take advantage of this and ramp the TPI from the inner diameter to the outer diameter of each zone 201, 203 and 205 as shown in call out window 100, thereby converting the extra margin into a higher areal data density. This increase in TPI across a zone is in addition to the slowly varying TPI from ID to OD of the disc previously mentioned.

Figure 2:
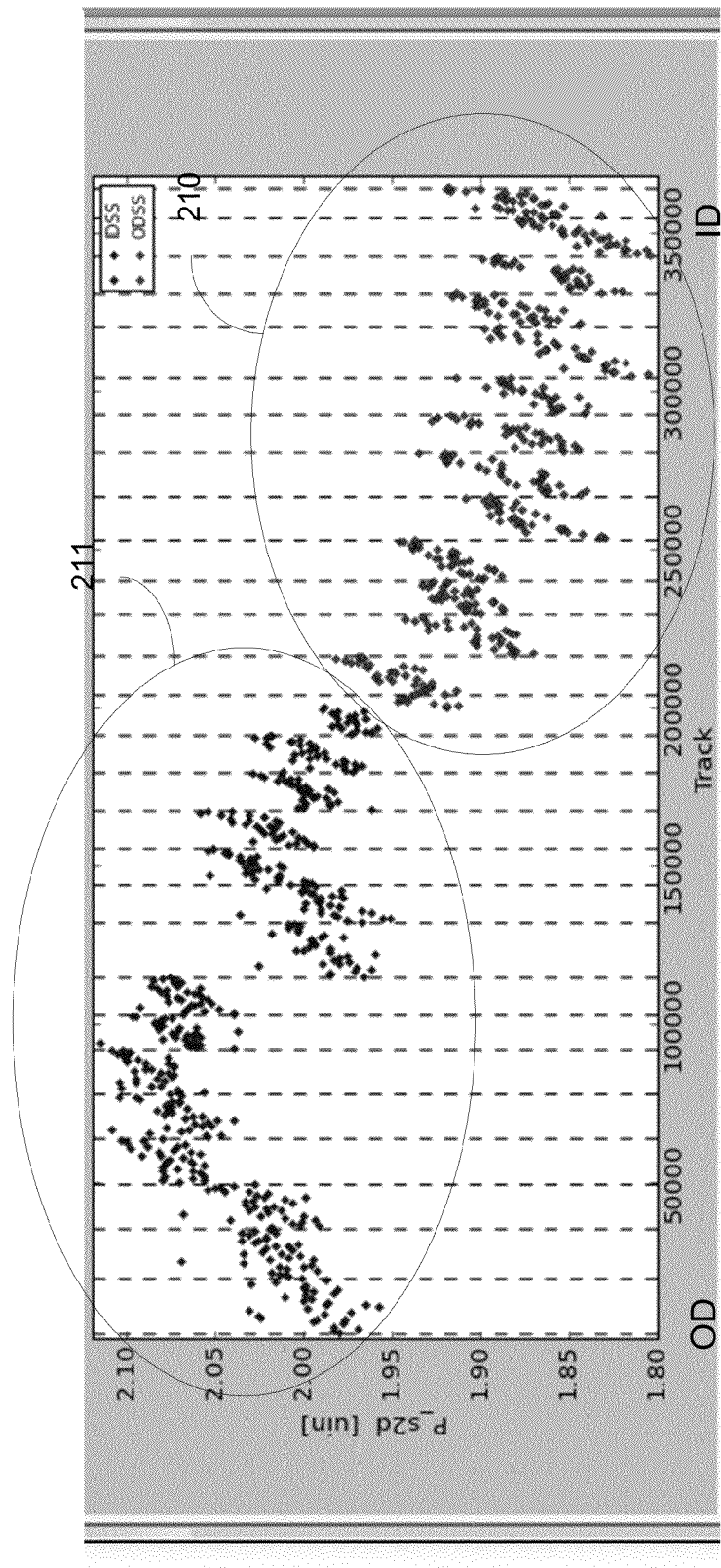
FIG. 2 is a graph of $P_{2SD}$ versus track of an illustrative storage disc.

FIG. 2 shows a measure of the squeeze-to-dead track pitch ($P_{S2D}$) or the track pitch at which the average codeword on the track fails, across zones as you go from the ID to the OD in each zone of a representative magnetic storage disc. $P_{S2D}$ is inversely proportional to the TPI, so a smaller $P_{S2D}$ is better. The drop in the measured $P_{S2D}$ across each zone is confirmation of the increased TPI margin from the ID to the OD of each zone.

The methods and devices described herein can be useful with all mechanical configurations of disc drives, e.g., those having either rotary or linear actuation. In addition, it may also be useful in all types of disc drives including hard disc drives, zip drives, floppy disc drives and any other type of drives where unloading the transducer from a surface and parking the transducer may be desirable.

Disclosed devices include at least one storage disc, for example a magnetic storage disc. A schematic example of a useful storage disc can be seen in FIG. 1. Such storage discs generally have a recording surface or surfaces (e.g., both surfaces of a magnetic storage disc can be configured for storage of data) that is segmented into a plurality of radial zones (e.g., 201, 203 and 205 in FIG. 1). Each of the plurality of zones has an inner diameter (ID) and an outer diameter (OD) (e.g., outer diameter 206 and inner diameter 207 of track 203). Within each zone is a plurality of tracks (e.g., tracks 200a and 200b of zone 201). The spacing of the tracks in a zone is described as the track density. One particular measure of track density is tracks per inch, or TPI.

Disclosed devices do not only utilize a track density within an individual zone that varies only according to the slowly varying dependence across the disk, but also include a specific track density intra-zone that changes. The intra-zone track density is ramped from one side of the zone to the other in order to take advantage of the increased TPI margin from the ID to the OD of the zone (which can be seen in the measurements shown in FIG. 2 with OD measurements 211 showing lower values than ID measurements 210). Each zone of a disclosed storage disc will have a track density ramp or more specifically a track density ramp ratio assigned thereto. A track density ramp ratio describes how the track density changes across the zone. More specifically, disclosed track density ramp ratios serve to increase the track density (e.g., make the tracks closer together) from the ID to the OD of an individual zone.

A track density ramp ratio (TDRR) can be defined by equation 1 below:

$$TDRR = \left(\frac{\Delta TPI}{TPI_{ID}}\right) \times \left(\frac{FCI_{ID}}{\Delta FCI}\right) \quad (1)$$

where $\Delta TPI$ is the change in the TPI across a zone that is over and above any slowly varying TPI change across the entire disc, $TPI_{ID}$ is the TPI at the inner diameter of the zone, $\Delta FCI$ is the change in the FCI across the zone, and $FCI_{ID}$ is the FCI at the inner diameter of the zone. TDRR can also be used to describe the change in TPI at any point within the zone relative to its value at the ID and relative to the change in FCI from that point to FCI at the ID.

Figure 3:
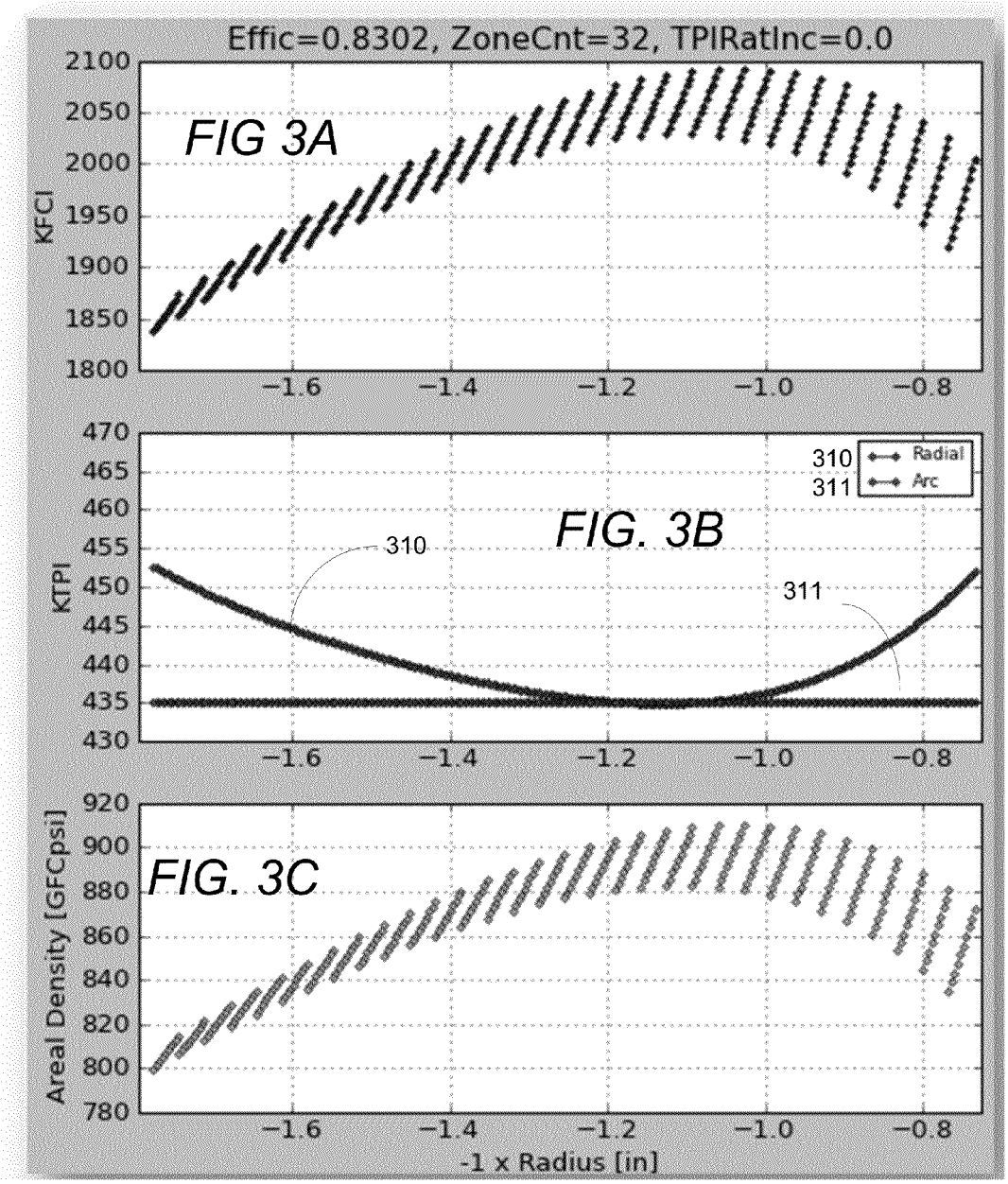
FIGS. 3A, 3B and 3C show flux changes per inch (FCI) from the inner diameter to the outer diameter of a disc (FIG. 3A), the tracks per inch (TPI) from the inner diameter to the outer diameter of the disc (FIG. 3B) and the areal density capability (ADC) from the inner diameter to the outer diameter of the disc (FIG. 3C) when not track density ramp ratio (TDRR) is utilized.
Figure 4:
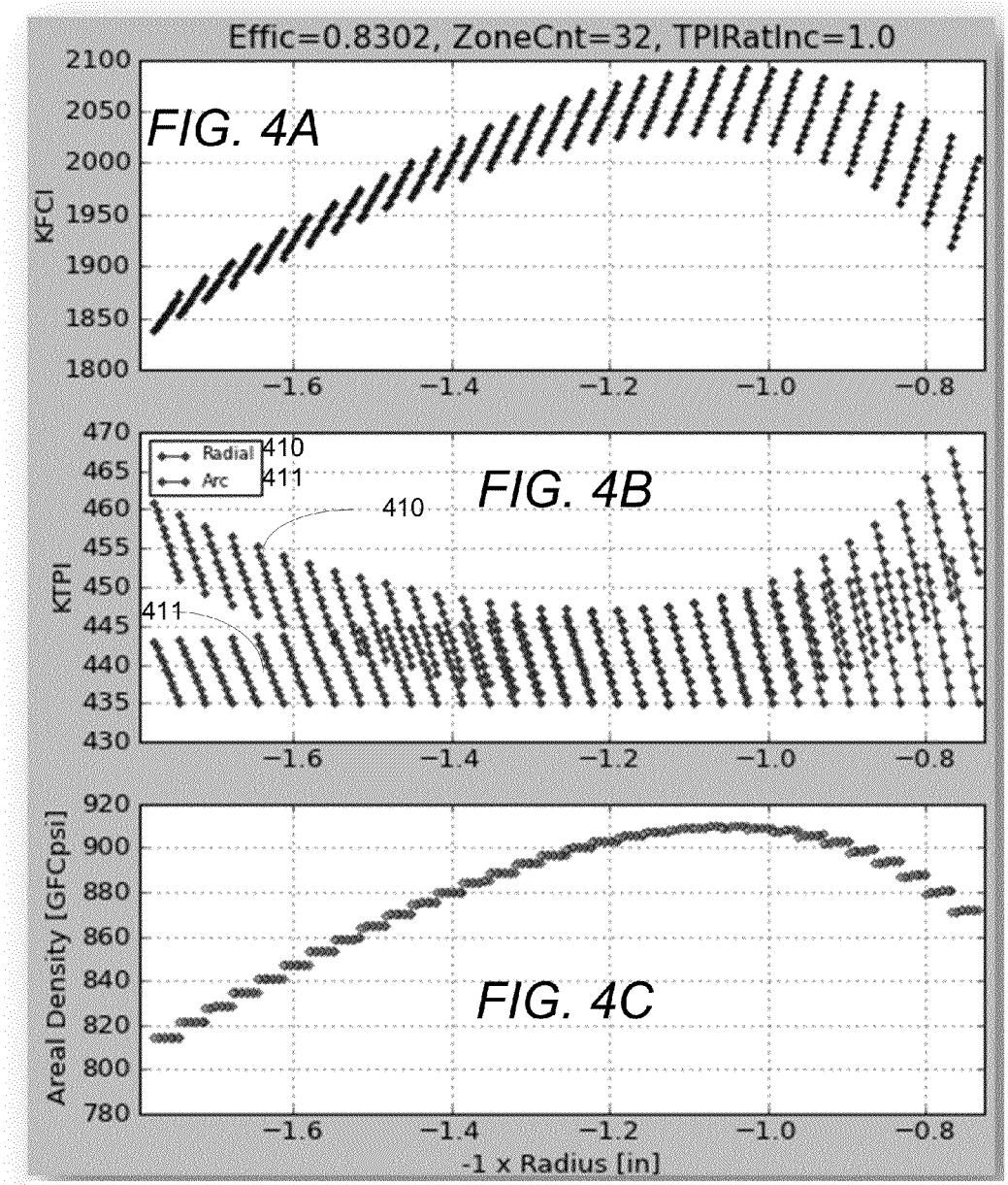
FIGS. 4A, 4B and 4C show FCI from the inner diameter to the outer diameter of a disc (FIG. 4A), the TPI from the inner diameter to the outer diameter of the disc (FIG. 4B) and the ADC from the inner diameter to the outer diameter of the disc (FIG. 4C) when the TDRR is 0.67.
Figure 5:
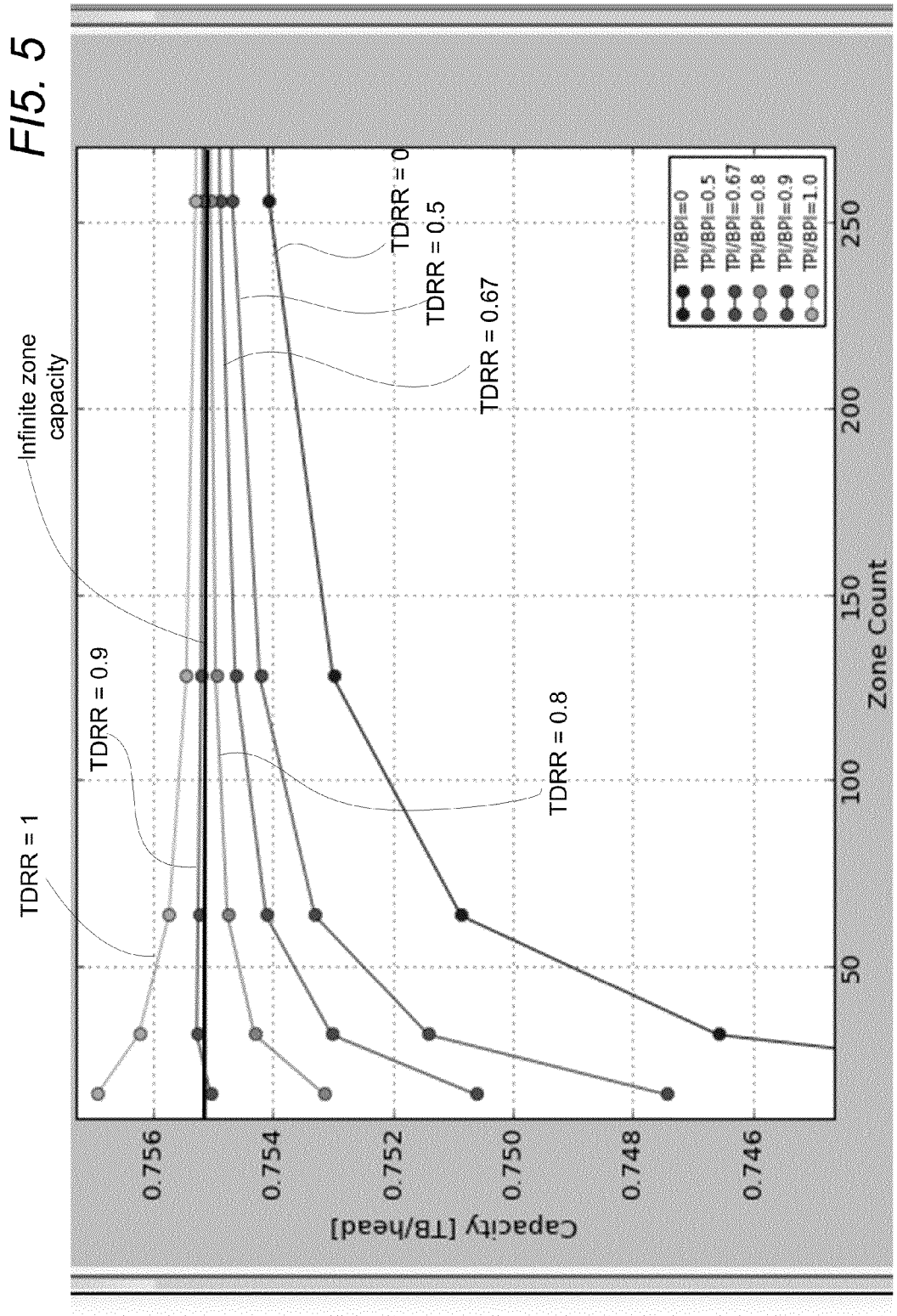
FIG. 5 shows the capacity (terabytes/head) versus number of zones for TDRR of 0, 0.5, 0.67, 0.8, 0.9 and 1.0.

FIGS. 3A, 3B and 3C show the FCI from the inner diameter (right side of graphs) to the outer diameter (left side of graphs) (FIG. 3A), and the TPI from the ID to the OD (FIG. 3B) for the idealized case where arc TPI 311 is constant across the drive compared to radial TPI 310. The areal density is shown from the ID to the OD (FIG. 3C) for a disc when the TDRR is zero or there is not TDRR. FIGS. 4A, 4B and 4C show the FCI from the inner diameter (right side of graphs) to the outer diameter (left side of graphs) (FIG. 4A), the radial TPI 410 and arc TPI 411 from the ID to the OD (FIG. 4B) and the areal density from the ID to the OD (FIG. 4C) for a disc when the TDRR equals 1. As seen in FIG. 3C, the drop of areal density within each zone is what is lost without using a TDRR. Conversely, FIG. 4C shows that the areal density is too aggressive at the OD and too conservative at the ID compared to the underlying slowly varying ideal shape. However, the situation of FIG. 4C versus FIG. 3C does lose less of the ADC. FIG. 5 also indicates the aggressiveness of the ADC at the OD when the TDRR equals 1 with 62 zones. As seen in FIG. 5, with a TDRR of 1, the capacity is larger than the infinite zone limit because it interferes with the areal density loss that is natural to the FCI taper. It should also be noted that 62 zones with a TDRR of 0.67 is virtually equivalent to 256 zones with no TDRR.

In some embodiments, the track density ramp ratio (TDRR) can be greater than 0 but less than 1. If the TDRR was zero (0), the track density would have only the underlying slow variation across the zone. If the TDRR were one (1), the TPI would increase 1% for every 1% drop in FCI in addition to any slow variation.

In some embodiments, each zone can have the same track density ramp ratio and in some embodiments, individual zones may have different track density ramp ratios. Embodiments where each zone has the same track density ramp ratio may offer advantages of simplicity, and less time spent determining numerous track density ramp ratios for example. Such embodiments may also offer the advantage of not pushing the reliability of the system to its extreme capabilities, if appropriate track density ramp ratios are chosen. Embodiments where each zone has the same track density ramp ratio may however sacrifice some capacity at the margins. Such an embodiment can offer an easier implementation but if the TPI is already being pushed on a head a lower track density ramp ratio may need to be chosen. Embodiments where individual zones may have different track density ramp ratios may offer advantages of maximizing the areal density capability of the magnetic storage disc and for equalizing the margins across the system, for example. Such embodiments may however be more complex to configure, and require gathering of more data for example.

In some embodiments a single track density ramp ratio can be utilized for all zones on a storage disc, such configurations can be referred to as a fixed track density ramp ratio. One way which the track density ramp ratio can be determined for a fixed track density ramp ratio is based on the radius at different points of the storage disc. For example, a fixed track density ramp ratio can be proportional to the change in the radius across each zone. The change in radius across each zone can be represented by equation 2 below:

$$\frac{\text{change in the radius of the zone from}}{\text{inner radius of the zone}} \quad (2)$$

In some embodiments, individual zones can have different TDRR, such configurations can be referred to as variable track density ramp ratio. In some embodiments, TDRR for different zones can be chosen such that the TDRR can compensate for a drop in FCI from the ID of a zone to the OD of the zone.

In some embodiments, TDRR for one or more zones of a storage disc can be determined by smoothing the change in areal density from one zone to the other by determining a TPI and FCI in adjacent zones. In some embodiments, a TPI and FCI can be determined for each zone, usually at the ID, either by direct measurement or by interpolation and the TPI is varied with each zone so that the areal density variation is continuous from zone to zone.

Figure 6:
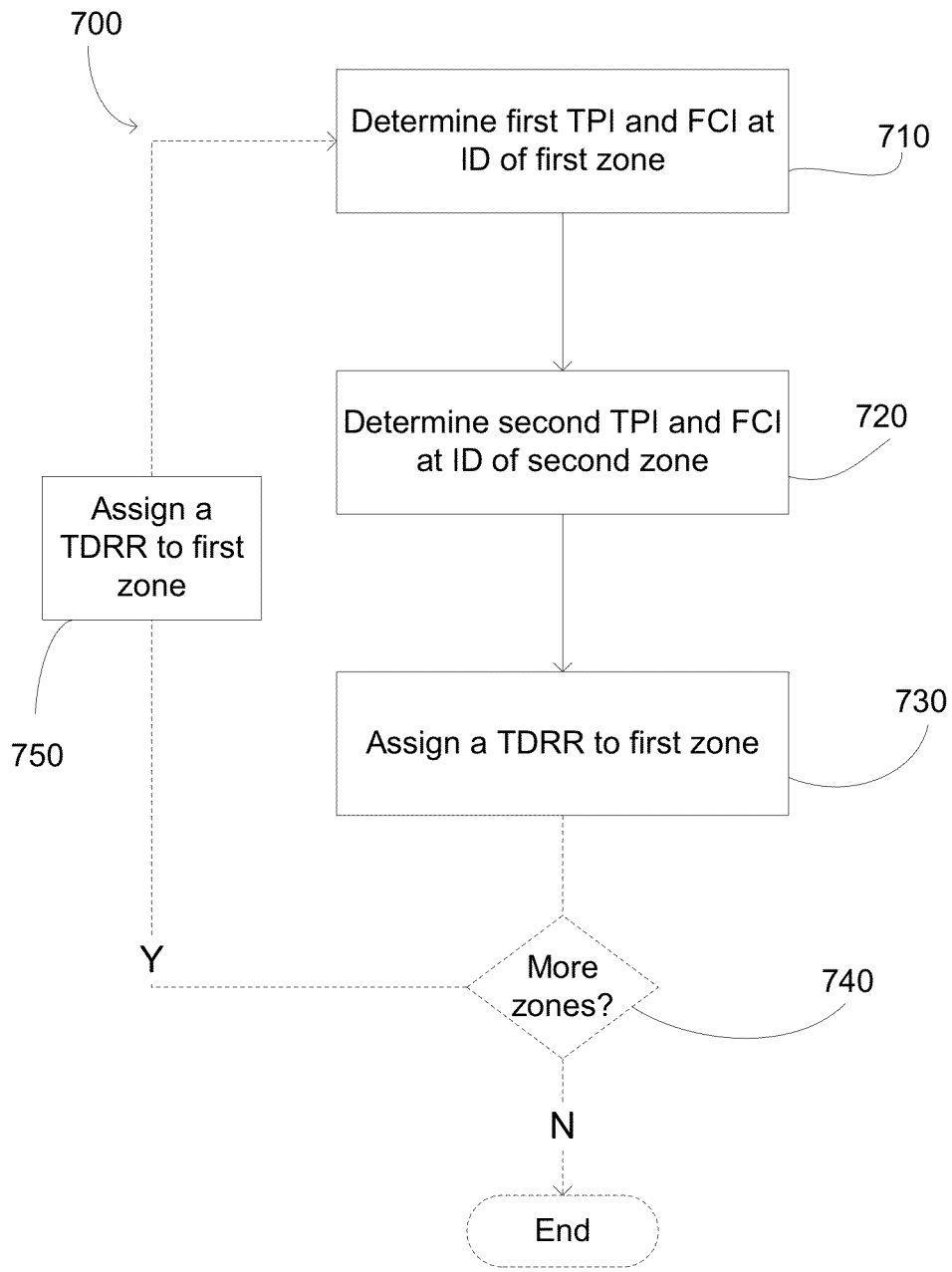
FIG. 6 is a flowchart illustrating disclosed methods.

More specifically, such methods can be described as seen in FIG. 6. The method 700 can include a first step 710 of determining a TPI and FCI at an inner diameter of a first zone. The TPI and FCI determined at the inner diameter of the first zone can be referred to as a "first TPI" and a "first FCI". Another step in disclosed methods is step 720, determining a TPI and FCI at an inner diameter of a second zone. The TPI and FCI of the second zone may be determined in the same way the TPI and FCI were determined for the first zone. The TPI and FCI at the inner diameter of the second zone can be referred to as a "second TPI" and a "second FCI" to distinguish them from the first TPI and first FCI. The second zone and the first zone are directly adjacent each other and the second zone is closer to the outer diameter of the storage disc than the first zone is. Stated another way, the first zone is closer to the inner diameter of the disc than the second zone.

Method 700 also includes a step 730 of determining a track density ramp ratio for the first zone based at least in part on the first TPI, the first FCI, the second TPI and the second FCI. The areal density of a track is the TPI*FCI. Therefore, the areal density of the track in the first zone is the first TPI*first FCI and the areal density of the track in the second zone is the second TPI*second FCI. In some embodiments, a track density ramp ratio for the first zone can be chosen to smooth the areal density from one zone to an adjacent zone (e.g., the first zone to the second zone). More specifically, a track density ramp ratio for the first zone can be chosen to render the areal density at the outer diameter of the first zone the same as the areal density at the inner diameter of the second zone. Track density ramp ratios determined using such methods may function to reduce loss of areal density across a storage disc.

Method 700 can optionally include additional steps. If there are more zones on the storage disc (decision 740), then steps 710, 720 and 730 can be repeated. Step 750 can also be implemented to measure the TPI capability at the ID of a given zone. Methods such as those depicted in FIG. 6 can be utilized in shingled magnetic recording (SMR), conventional magnetic recording (CMR) or any other data recording (magnetic or otherwise) methods. Furthermore, it is possible to vary the TPI within a zone according to a formula different from the TDRR.

Figure 7:
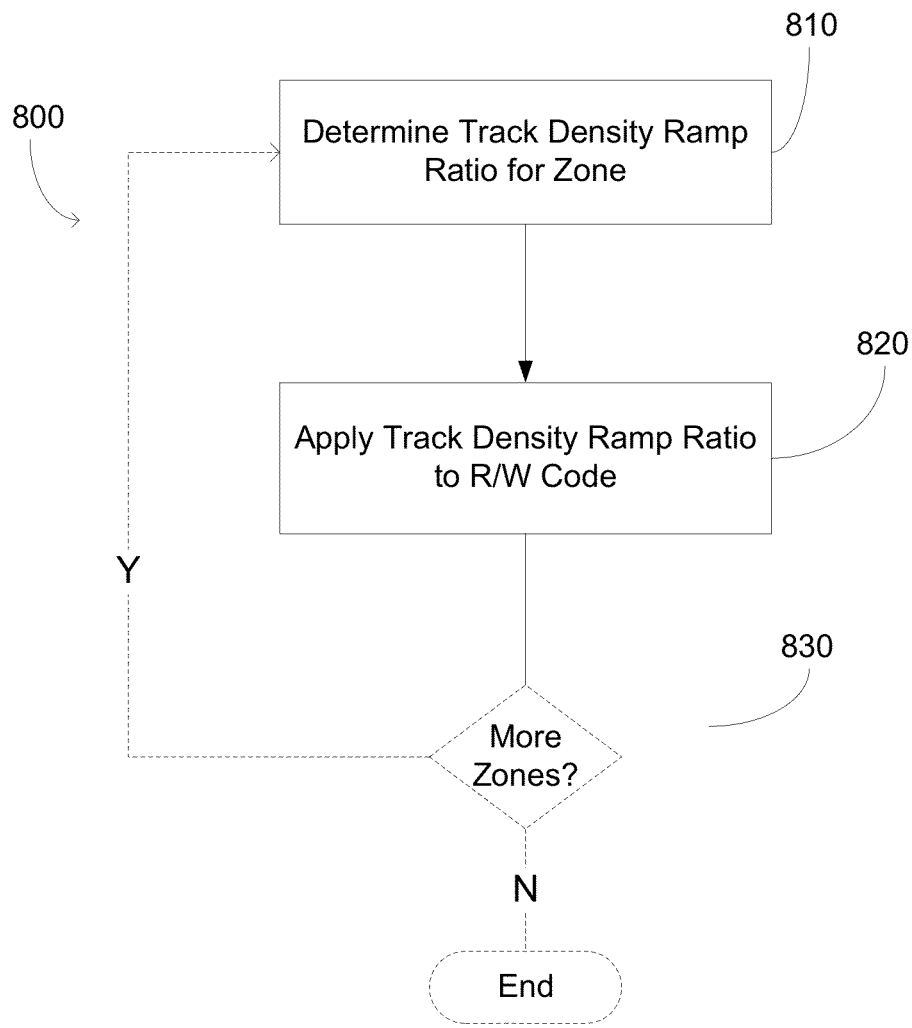
FIG. 7 is a flowchart illustrating disclosed methods.

FIG. 7 illustrates additional disclosed methods. Method 800 can include a first step, step 810 of determining a track density ramp ratio for a zone. In some embodiments this step can determine the track density ramp ratio for a first zone, for example. The track density ramp ratio can be determined using any of the methods disclosed above, for example, it can be determined based on the radius at different points of the storage disc, by determining the TPI and FCI and different tracks, or any combination thereof. At step 820 the track density determined in step 810 can then be applied to an applicable read/write (R/W) code utilized in the storage device. Method 800 can optionally include additional steps. If there are more zones on the storage disc (decision 830), then steps 810 and 820 can be repeated.

Methods disclosed and illustrated herein can utilize or determine various track density ramp ratios. In some embodiments, useful track density ramp ratios can be not greater than 1. In some embodiments, useful track density ramp ratios can be not less than 0.2, not less than 0.5, or not less than 0.6 for example. In some embodiments, especially for the inner half of the disk, it is possible that the best TDRR is greater than 1.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of methods of controlling track density and devices having variable track density are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. A device comprising:
   at least one storage disc having a recording surface segmented into a plurality of radial zones, each radial zone having an inner diameter and an outer diameter;
   each of the plurality of zones having a plurality of tracks; and
   a track density ramp ratio assigned to each of the plurality of radial zones, the track density ramp ratio increases the track density from the inner diameter of the radial zone to the outer diameter of the radial zone.

2. The device according to claim 1, wherein the $$\text{track density ramp ratio} = \left(\frac{\Delta TPI}{TPI_{ID}}\right) \times \left(\frac{FCI_{ID}}{\Delta FCI}\right),$$

where $TPI_{ID}$ is tracks per inch at the inner diameter of a first zone, $FCI_{ID}$ is flux changes per inch at the inner diameter of a first zone, $\Delta TPI$ is change in tracks per inch across the first zone and $\Delta FCI$ is change in flux changes per inch across a zone.

3. The device according to claim 1, wherein the track density ramp ratio for each of the radial zones are equal to each other.

4. The device according to claim 1, wherein the track density ramp ratio for each of the radial zones is proportional to a change in a radius of the radial zone from the inner diameter to the outer diameter divided by an inner radius of the radial zone.

5. The device according to claim 1, wherein the track density ramp ratio is chosen to obtain a smooth areal density across a radius of the storage disc.

6. The device according to claim 1, wherein the track density ramp ratio ranges from about 0.5 to about 1.

7. The device according to claim 1, wherein the device is a shingled magnetic recording (SMR) drive.

8. The device according to claim 1, wherein a total number of the radial zones on the recording surface is less than or equal to 100.

9. A method comprising:
   determining a first tracks per inch (TPI) and flux changes per inch (FCI) value of a first track, the first track being one of a plurality of radial concentric tracks on a recording surface of a storage disc, the plurality of radial concentric tracks being segmented into a plurality of zones, each of the plurality of zones having an inner zone diameter and an outer zone diameter, the first track being at the inner zone diameter of a first zone;
   determining a second TPI and FCI at an inner zone diameter of a second zone, the second zone adjacent to the first zone but closer to an outer diameter of the storage disc than the first zone; and
   assigning a track density ramp ratio for the first zone such that a value of areal density (TPI*FCI) at the outer zone diameter of the first zone is the same as the areal density at the inner zone diameter of the second zone.

10. The method according to claim 9 further comprising measuring a TPI capability at the inner zone diameter of each of the plurality of zones.

11. The method according to claim 10 further comprising determining the track density ramp ratio for each of the plurality of zones.

12. The method according to claim 9, wherein the storage disc is a shingled magnetic recording (SMR) disc and the plurality of zones number less than or equal to 60.

13. The method according to claim 9, wherein the storage disc is a continuous magnetic recording (CMR) disc.

14. The method according to claim 9, wherein the track density ramp ratio ranges from about 0.5 to about 1.

15. A method comprising:
    determining a first track density ramp ratio (TDRR) for a first zone, the first zone being one of a plurality of radial zones, each of the plurality of radial zones having an inner zone diameter and an outer zone diameter, each of the plurality of radial zones containing a plurality of radial concentric tracks on a recording surface of a storage disc,
    the first track density ramp ratio chosen to compensate for a drop in flux changes per inch (FCI) from the inner zone diameter to the outer zone diameter of the first zone; and
    determining a second track density ramp ratio for a second zone, the second zone being one of the plurality of radial zones.

16. The method according to claim 15, wherein the step of determining the first track density ramp ratio for the first zone comprises measuring a tracks per inch (TPI) capability at the inner zone diameter of the first zone; and measuring the TPI capability at the inner zone diameter of the second zone, the second zone adjacent to the first zone but closer to an inner diameter of the storage disc than the first zone.

17. The method according to claim 15, wherein the first TDRR for the first zone ranges from about 0.6 to about 1.

18. The method according to claim 15 further comprising determining the track density ramp ratio for each of the plurality of zones and applying the TDRR to a read/write code for a storage device.

19. The method according to claim 15, wherein the storage disc is a magnetic storage disc and the plurality of radial zones number less than or equal to 32.

20. The method according to claim 15, wherein the magnetic storage disc is a shingled magnetic recording (SMR) disc.

* * * * *